UNITED STATES PATENT OFFICE 2,302,988

BRICK AND PROCESS OF MANUFACTURING SAME

George Witty, New York, N. Y.

No Drawing. Application September 23, 1941, Serial No. 412,050

4 Claims. (Cl. 106—95)

The present invention relates to a process of, and material for, the manufacture of brick, tile or the like, my object being the provision of a material of a nature capable of thoroughly cementations, as well as a process wherein this material may be thoroughly cemented without the necessity of burning in a kiln, as is necessary with clay products.

A further object is therefore the provision of a material and process by means of which brick and tile may be formed in a variety of shapes, impractical in a burnt brick on account of warping, breaking and cracking during the burning process.

A further object consists in a process whereby materials in the nature of bi-product, such as blast furnace slag, lime sludge, alkali sludge or calcium sulphate sludge may be utilized in the formation of lasting and efficient brick or tile.

These bricks are formed of a composition consisting of the following ingredients, combined in about the propositions stated, viz., granulated blast furnace slag 50 parts, lime or calcium sulphate sludge 25 parts, hydraulic cement 15 parts, calcium chloride 4 parts, barium carbonate 3 parts, and calcium stearate 2 parts, all parts are by weight.

In carrying out the process, the granulated slag, the lime sludge, the hydraulic cement and the calcium stearate are mixed dry. The calcium chloride and barium carbonate are separately mixed with sufficient quantity of water to form a fluid mass, after which all the ingredients are thoroughly commingled. When all the ingredients are thoroughly commingled, the mass should be just such consistency as will permit it to be filled into molds, after being placed in the molds the mixture therein is subjected to heavy pressure, and after being thoroughly compressed the masses are removed from the molds and dried at a temperature of approximately 100° Fahrenheit for 10 hours after which they are removed and are ready for use.

The final product will be a brick of grayish pink color which may be converted into any color desired by the addition of suitable mineral pigments.

The brick thus constructed improves with age and has great crushing strength while being light in weight and low in absorption. Furthermore, these bricks provide a better bond with mortar and when so used or exposed to the atmosphere or weather do not scale or disintegrate under extreme climatic change. The bricks made from these materials and in the manner described are particularly economical due to the fact that they are products with a uniformity of size, shape and color.

Referring to the sludges used in carrying out the process. The lime sludge is a bi-product in certain industries. An example of such sludge is the residue left on the decomposition of calcium carbid to produce acetylene. The calcium sulphate sludge is a bi-product in the manufacture of phosphoric acid by the batch or intermitted process, which is usually left as a deposit in the filter or tanks. The alkali sludge is an impure calcium carbonate, resulting from the manufacture of alkali products. All these bi-products are found in an unlimited quantity and have no value at all for commercial uses.

The cement referred to may be Portland, or other hydraulic cement. However, the cement may in some instances be omitted as the reaction between the lime sludge, calcium chloride and barium carbonate when the mixture is subjected to hydration produce oxychloride which have highly cementitious properties to aid in binding the slag aggregate.

Instead calcium chloride, magnesium chloride may be used. Barium chloride may be used instead of barium carbonate. Instead of slag other light weight aggregates may be used such as cinder, volcanic lava, etc. If desired sand may be employed.

While I have described my invention in detail, I do not wish to limit my invention thereto or thereby as some of the ingredients mentioned may be omitted, other ingredients may be employed, changes may be made in the proportions, of the ingredients all without departing from the spirit of the invention.

Having now described my invention what I claim as new and desire to secure by Letters Patent is:

1. A plastic composition adapted to set by hydration comprising substantially 50 parts ground blast furnace slag, 25 parts lime sludge, 15 parts hydraulic cement, 4 parts calcium chloride, 3 parts barium carbonate and 2 parts calcium stearate.

2. A brick comprising the following ingredients in substantially the proportions given:

| | Parts |
|---|---|
| Ground blast furnace slag | 50 |
| Lime sludge | 25 |
| Hydraulic cement | 15 |
| Calcium chloride | 4 |
| Barium carbonate | 3 |
| Calcium stearate | 2 |

3. In the manufacture of brick or the like a method which comprises mixing in the dry state and substantially the stated proportions, 50 parts ground blast furnace slag, 25 parts lime sludge, 15 parts hydraulic cement, 4 parts calcium chloride, 3 parts barium carbonate, 2 parts calcium stearate, adding sufficient water under pressure and drying the resultant product at a temperature of 100° F. for 10 hours.

4. In the manufacture of a brick or the like, a method which comprises simultaneously reacting together in the presence of water 50 parts ground slag, 25 parts calcium sludge, 15 parts hydraulic cement, 4 parts calcium chloride, 3 parts barium carbonate and 2 parts calcium stearate and permitting said reactant to set into a uniform coherent mass.

GEORGE WITTY.